(12) United States Patent
Hodson et al.

(10) Patent No.: US 10,129,040 B2
(45) Date of Patent: Nov. 13, 2018

(54) VIRTUAL WATER COOLER DISCUSSION SESSIONS

(71) Applicant: Avaya Inc., Santa Clara, CA (US)

(72) Inventors: Jeffrey D. Hodson, San Jose, CA (US); John H. Yoakum, Cary, NC (US)

(73) Assignee: Avaya Inc., Santa Clara, CA (US)

( * ) Notice: Subject to any disclaimer, the term of this patent is extended or adjusted under 35 U.S.C. 154(b) by 195 days.

(21) Appl. No.: 14/807,301

(22) Filed: Jul. 23, 2015

(65) Prior Publication Data
US 2017/0026191 A1 Jan. 26, 2017

(51) Int. Cl.
*H04L 12/18* (2006.01)
*H04L 29/06* (2006.01)
*H04L 29/08* (2006.01)

(52) U.S. Cl.
CPC ...... *H04L 12/1813* (2013.01); *H04L 12/1818* (2013.01); *H04L 65/1073* (2013.01); *H04L 65/403* (2013.01); *H04L 67/22* (2013.01)

(58) Field of Classification Search
CPC .............. H04L 12/1813; H04L 65/1073
See application file for complete search history.

(56) References Cited

U.S. PATENT DOCUMENTS

| | | | | |
|---|---|---|---|---|
| 8,731,174 B1* | 5/2014 | Noble, Jr. | ........... | H04M 3/5175 379/265.01 |
| 8,819,129 B1* | 8/2014 | Cyriac | ................ | H04L 65/1046 709/204 |
| 2003/0086555 A1* | 5/2003 | McIlwaine | ............. | G06Q 10/04 379/265.02 |
| 2003/0174830 A1* | 9/2003 | Boyer | ..................... | H04M 3/51 379/265.02 |
| 2012/0057691 A1* | 3/2012 | Moran | .............. | H04M 3/42221 379/265.02 |
| 2012/0257518 A1* | 10/2012 | Erhart | .................. | H04L 41/5061 370/252 |
| 2015/0378577 A1* | 12/2015 | Lum | ...................... | G06Q 10/10 715/720 |
| 2016/0269561 A1* | 9/2016 | Srinivasan | .............. | H04M 3/56 |

* cited by examiner

*Primary Examiner* — Brian J. Gillis
*Assistant Examiner* — Chhian Ling
(74) *Attorney, Agent, or Firm* — Sheridan Ross P.C.

(57) ABSTRACT

A computing device including a processor device determines that a contact center agent (CCA) is in a non-contact session mode. A particular open conference session of a plurality of open conference sessions is identified. A CCA device associated with the CCA is connected to the particular open conference session.

20 Claims, 13 Drawing Sheets

VIRTUAL WATER COOLER DISCUSSION SESSIONS

TECHNICAL FIELD

The embodiments relate to contact centers and, in particular, to virtual water cooler discussion sessions for contact center agents not engaged in a contact session with a customer.

BACKGROUND

Conventionally, a contact center employed a number of contact center agents physically located at a place of business. The contact center agents, in between calls, might converse with one another to share experiences, seek guidance regarding troubling or difficult experiences with customers, or converse for social purposes. Increasingly however, in view of the costs of office space and the technological flexibility offered by modern contact center systems, contact center agents are increasingly distributed from one another, and may even work alone, such as from their house.

While working from home often has an initial appeal, employees that work from home often complain about the lack of camaraderie, and the inability to exchange thoughts and ideas with co-workers. This isolation can ultimately reduce the enthusiasm an employee has for a job, and negatively impact job performance.

SUMMARY

The embodiments relate to contact center agents (CCAs) and virtual water cooler discussion sessions, also referred to herein as open conference sessions. The embodiments determine when a CCA is not involved in a contact session, identify a particular open conference session of a plurality of different open conference sessions, and connect a CCA device associated with the CCA to the particular open conference session. The CCA may then engage in discussions with other CCAs that are connected to the particular open conference session. The embodiments implement a virtual version of conventional water cooler discussions.

In one embodiment, a method is provided. A computing device comprising a processor device determines that a CCA is in a non-contact session mode. A particular open conference session of a plurality of open conference sessions is identified. A CCA device associated with the CCA is connected to the particular open conference session.

In one embodiment, determining that the CCA is in a non-contact session mode includes determining a termination of a contact session between the CCA device and a contacting individual (CI) device associated with a CI.

In one embodiment, determining that the CCA is in a non-contact session mode comprises determining that the CCA is in a break mode.

In one embodiment, identifying the particular open conference session of the plurality of open conference sessions includes identifying the particular open conference session based on a criterion without input from the CCA.

In one embodiment, connecting the CCA device associated with the CCA to the particular open conference session includes automatically, without CCA interaction, connecting the CCA device to the particular open conference session.

In one embodiment, the criterion comprises a topic of a previous contact session handled by the CCA.

In one embodiment, identifying the particular open conference session of the plurality of open conference sessions includes selecting a subset of open conference sessions of the plurality of open conference sessions based on a criterion. A list identifying the subset of open conference sessions is communicated to the CCA device. A user selection of the particular open conference session from the list identifying the subset of open conference sessions is received from the CCA device.

In one embodiment, the criterion is based on a preference identified by the CCA. The computing device accesses an agent profile associated with the CCA. Based on the agent profile, the preference identified by the CCA is determined.

In one embodiment, it is determined that a new contact session is to be processed by the CCA. Automatically, without CCA input, the CCA device is disconnected from the particular open conference session. The CCA device is connected to the new contact session.

In one embodiment, the CCA is alerted that the CCA device is being disconnected from the particular open conference session.

In one embodiment, an identity of each other CCA of a plurality of CCAs in the particular open conference session is determined. The identity of each other CCA is sent to the CCA device for presentation to the CCA.

In another embodiment, a computing device is provided. The computing device includes a communications interface configured to communicate with a network. The computing device also includes a controller comprising a processing device coupled to the communications interface. The controller is configured to determine that a contact center agent (CCA) is in a non-contact session mode. A particular open conference session of a plurality of open conference sessions is identified. A CCA device associated with the CCA is connected to the particular open conference session.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps.

The embodiments relate to contact center agents and virtual water cooler discussion sessions, also referred to herein as open conference sessions. The embodiments determine when a contact center agent (CCA) is not involved in a contact session, identify a particular open conference session of a plurality of different open conference sessions, and connect a CCA device associated with the CCA to the particular open conference session. The CCA may then engage in discussions with other CCAs that are connected to the particular open conference session. Among other features, the embodiments facilitate a virtual version of conventional water cooler discussions.

Figure 1:
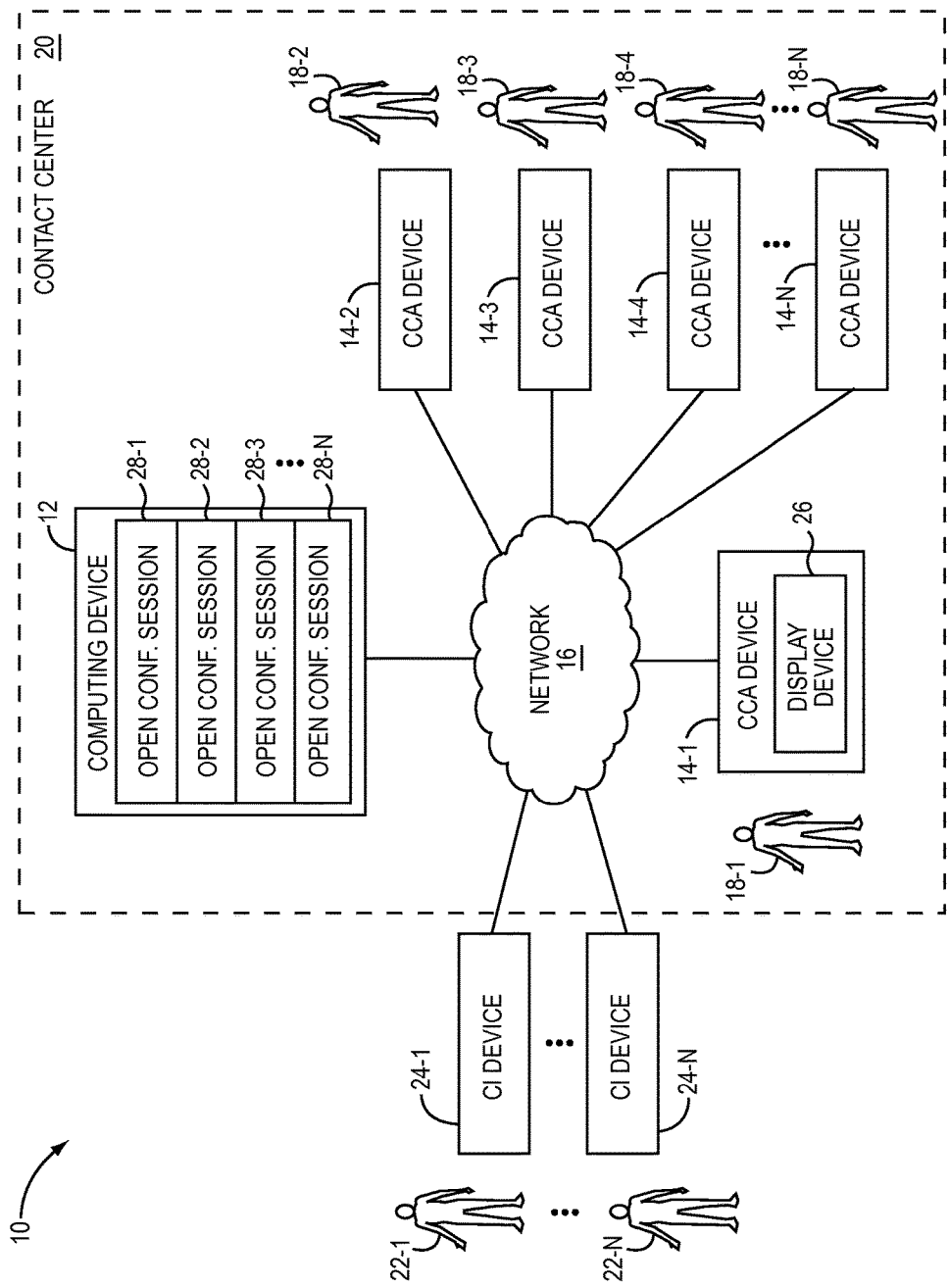
FIG. 1 is a block diagram of an environment in which embodiments may be practiced.

FIG. 1 is a block diagram of an environment 10 in which embodiments may be practiced. The environment 10 includes a computing device 12 that is communicatively coupled to a plurality of contact center agent (CCA) devices 14-1-14-N (generally, CCA devices 14) via one or more networks 16. The CCA devices 14 may comprise any computing apparatus capable of implementing the functionality described herein. In one embodiment, a CCA device 14 comprises a desktop or laptop computer that includes audio capabilities to allow a corresponding CCA 18-1-18-N (generally, CCAs 18) to converse with other individuals via the CCA device 14. Thus, the CCA device 14 may include an output port capable of providing audio signals received via the network 16 to an output device, such as headphones or speakers, as well as an input port capable of receiving audio signals generated by the corresponding CCA 18 via an input device, such as a microphone. In some embodiments, the CCA device 14 may comprise an integrated system of more than one device, such as a desktop or laptop computer and a telephone.

The network 16 may comprise one or more wired and/or wireless networks capable of carrying data between the computing device 12 and the CCA devices 14. The computing device 12 and the CCA devices 14 are part of a contact center 20, which is an entity which provides support to contacting individuals (CIs) 22-1-22-N (generally, CIs 22) who contact the contact center to obtain information via respective CI devices 24-1-24-N (generally, CI devices 24), such as laptop or desktop computers, smartphones, computing tablets, telephones, or the like.

In some embodiments, the computing device 12 may be geographically separated from the CCA devices 14, and the CCA devices 14 may be geographically separated from one another. For instance, the computing device 12 may be located in a physical location associated with the contact center 20, and the CCA devices 14 may be located in the respective residences of the CCAs 18. Among other features, the CCA devices 14 may also include corresponding display devices 26 (only one illustrated). Typically, the computing device 12 and the CCA devices 14 include contact center system software that facilitates coordination between the computing device 12 and the CCA devices 14.

Assume that the CI 22-1 has a support issue with a recently purchased product. Further assume that the mode of communication will be an audio session, although the embodiments are not limited to audio sessions, and have applicability in any type of contact center session, including, by way of non-limiting example, video sessions, text message, instant message, and email contact sessions. The CI 22-1 utilizes the CI device 24-1 to call a telephone number provided in the packaging associated with the product. The telephone call is routed to the computing device 12. The computing device 12 answers the call and may interact with the CI 22-1 via an automated sequence of questions to determine a category of support. The computing device 12 then determines if any suitable CCAs 18 are in a non-contact session mode.

Assume that the computing device 12 determines that the CCA 18-1 is in a non-contact session mode. The computing device 12 generates data that identifies the CCA 18-1 as being in a contact session mode. The computing device 12 establishes a communication session between the CI device 24-1 and the CCA device 14-1. The CCA 18-1 and the CI 22-1 may then communicate with one another. The computing device 12 may stay in the path of the communications, and thus may be able to record, analyze, or otherwise process the audio signals of the CI 22-1 and the CCA 18-1, and determine when the CI device 24-1 and the CCA device 14-1 terminate communications.

After the CCA 18-1 provides the requested service to the CI 22-1, the CCA 18-1 may terminate the connection with the CI 22-1. The computing device 12 may be automatically aware of this; the CCA device 14-1 may notify the computing device 12 that the connection has terminated; or the computing device 12 may not be aware of the termination of the connection at this point. The CCA 18-1 may continue to be in the contact session mode while the CCA 18-1 generates a contact center session record regarding the communication with the CI 22-1. At the end of such process, the CCA 18-1 may save the contact center session record via the contact center system software. The CCA 18-1 may then be placed into a non-contact session mode, or, if another CI 22 is queued for support by the CCA 18-1, the CCA 18-1 may remain in the contact session mode.

The computing device 12 may than automatically establish a next communication session between the CCA device 14-1 and another CI device 24 so that the CCA 18-1 can process the next CI 22. In other embodiments, the computing device 12 may determine that a break mode criterion or break mode criteria have been met, wherein the CCA 18-1 is placed in a break mode. For example, the computing device 12 may determine that the CCA 18-1 has processed a predetermined number of contact sessions without a break, or has been processing successive contact sessions for a predetermined amount of time without a break. When in break mode, the CCA 18-1 is also in the non-contact session mode. The CCA 18-1 may also be placed in the non-contact session mode because no additional CIs 22 are queued for support for the CCA 18-1.

In one embodiment, when the CCA 18-1 is in the non-contact session mode, the computing device 12 may identify a particular open conference session 28-1-28-N (generally, open conference sessions 28), and connect the CCA device 14-1 to the particular open conference session 28 to allow the CCA 18-1 to converse with other CCAs 18, supervisors, or other individuals in the particular open conference session 28. In some embodiments, an open conference session 28 may include a celebrity. An open conference session 28 is a conference session that remains open such that CCAs 18 may intermittently participate in the open conference session 28 when in the non-contact session mode. The open conference sessions 28 implement virtual water cooler discussions between the CCAs 18, such that the CCAs 18 can "drop into" an open conference session 28 any time the CCA 18 is in the non-contact session mode, and can leave the open conference session 28 either at the request of the CCA 18, or, as described in greater detail below, at times determined by the computing device 12.

Figure 2:
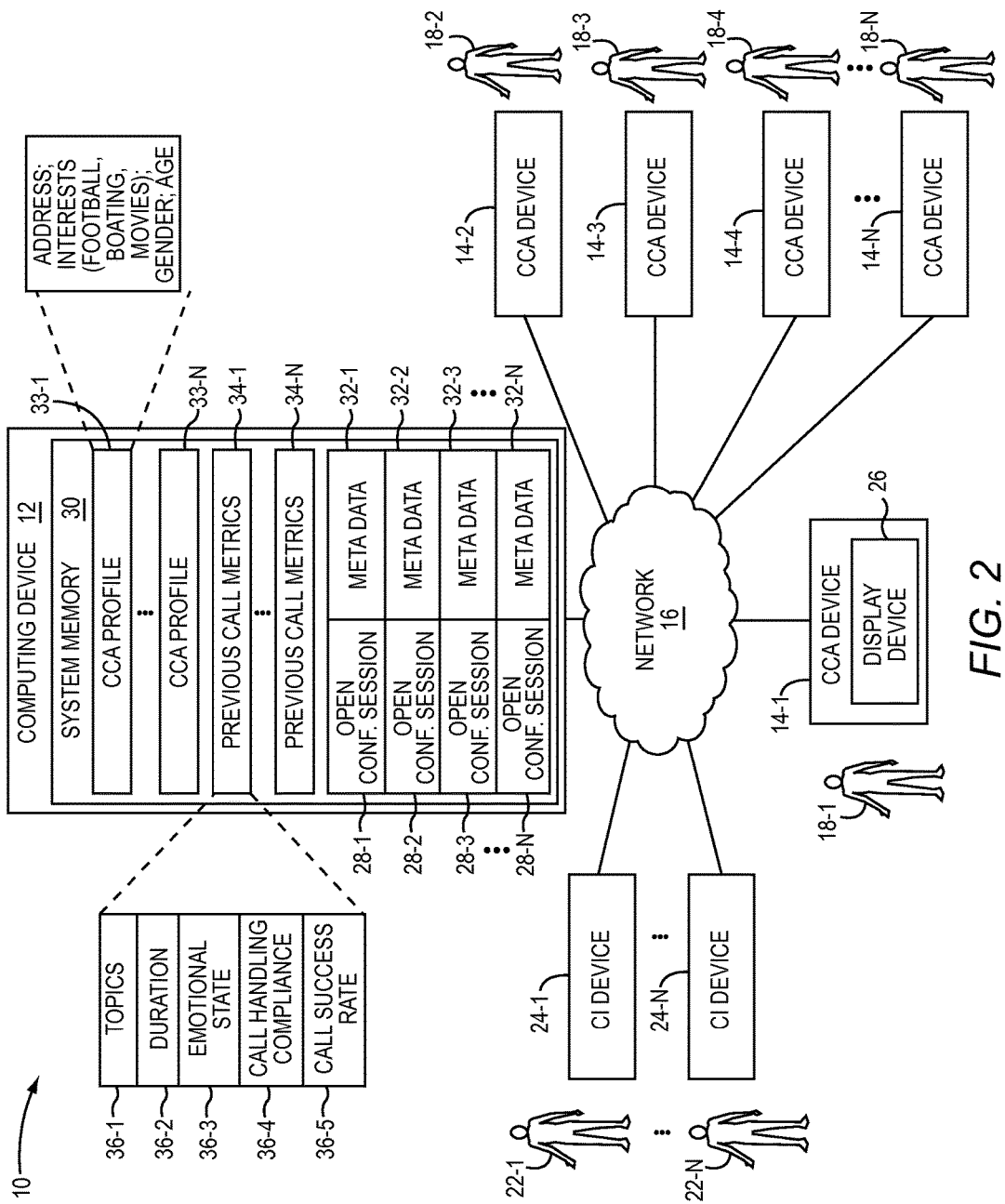
FIG. 2 is a block diagram of the environment illustrated in FIG. 1 illustrating certain aspects in greater detail, according to one embodiment.

FIG. 2 is a block diagram of the environment 10 illustrated in FIG. 1 showing the computing device 12 in greater detail, according to one embodiment. The computing device 12 includes a system memory 30 in which meta data 32-1-32-N (generally, meta data 32) that corresponds to each open conference session 28 is maintained. The meta data 32 may comprise, for example, the identity of the particular CCAs 18 that correspond to the CCA devices 14 that are currently connected to the corresponding open conference session 28. The meta data 32 may also identify, by keyword, or other classification system, a topic associated with the corresponding open conference session 28. For example, the meta data 32 may identify one open conference session 28 as relating to a topic entitled "Irate Customers." Other meta data 32 may identify corresponding open conference sessions 28 as relating to "Verbose Customers," "Intermittent Discussions," "Sports," "Cooking," and the like.

The system memory 30 may also include information about the CCAs 18, such as one or more CCA profiles 33-1-33-N (generally, CCA profiles 33). Each CCA profile 33 corresponds to a particular CCA 18, and may identify information about the corresponding CCA 18, such as a residential address, interests of the CCA 18, gender, age, and the like. In some embodiments, as will be discussed in greater detail herein, the computing device 12 may utilize the CCA profile 33 that corresponds to a CCA 18 to automatically select a particular open conference session 28 for the CCA 18 based on a particular criterion. Alternatively, the computing device 12 may utilize the CCA profile 33 that corresponds to a CCA 18 to automatically select a subset of open conference sessions 28 that may then be presented to the CCA 18 to facilitate a selection, by the CCA 18, of a particular open conference session 28.

The computing device 12 may also maintain previous call metrics 34-1-34-N (generally, previous call metrics 34) that correspond to the CCAs 18. The previous call metrics 34 may include, by way of non-limiting example, topic data 36-1 that identifies the topics of previous contact sessions between the corresponding CCA 18 and various CIs 22. Duration data 36-2 identifies the length of previous contact sessions between the corresponding CCA 18 and the various CIs 22. Emotional state data 36-3 identifies the identified emotional state of the corresponding CCA 18 during previous contact sessions, such as angry, happy, irritated, or the like. In one embodiment, the emotional state of the corresponding CCA 18 may be identified automatically by the CCA device 14, or the computing device 12, by analyzing the audio signals of the CCA 18. Call handling compliance data 36-4 may quantify the extent to which the CCA 18 followed established protocols in previous contact sessions with the various CIs 22. Call success rate data 36-5 quantifies the extent to which previous contact sessions with the various CIs 22 resulted in successful resolutions. The computing device 12 may utilize the previous call metrics 34 to automatically select a particular open conference session 28 for the CCA 18. Alternatively, the computing device 12 may utilize the previous call metrics 34 to automatically select a subset of open conference sessions 28 that may then be presented to the CCA 18 to facilitate a selection, by the CCA 18, of a particular open conference session 28.

Figure 3:
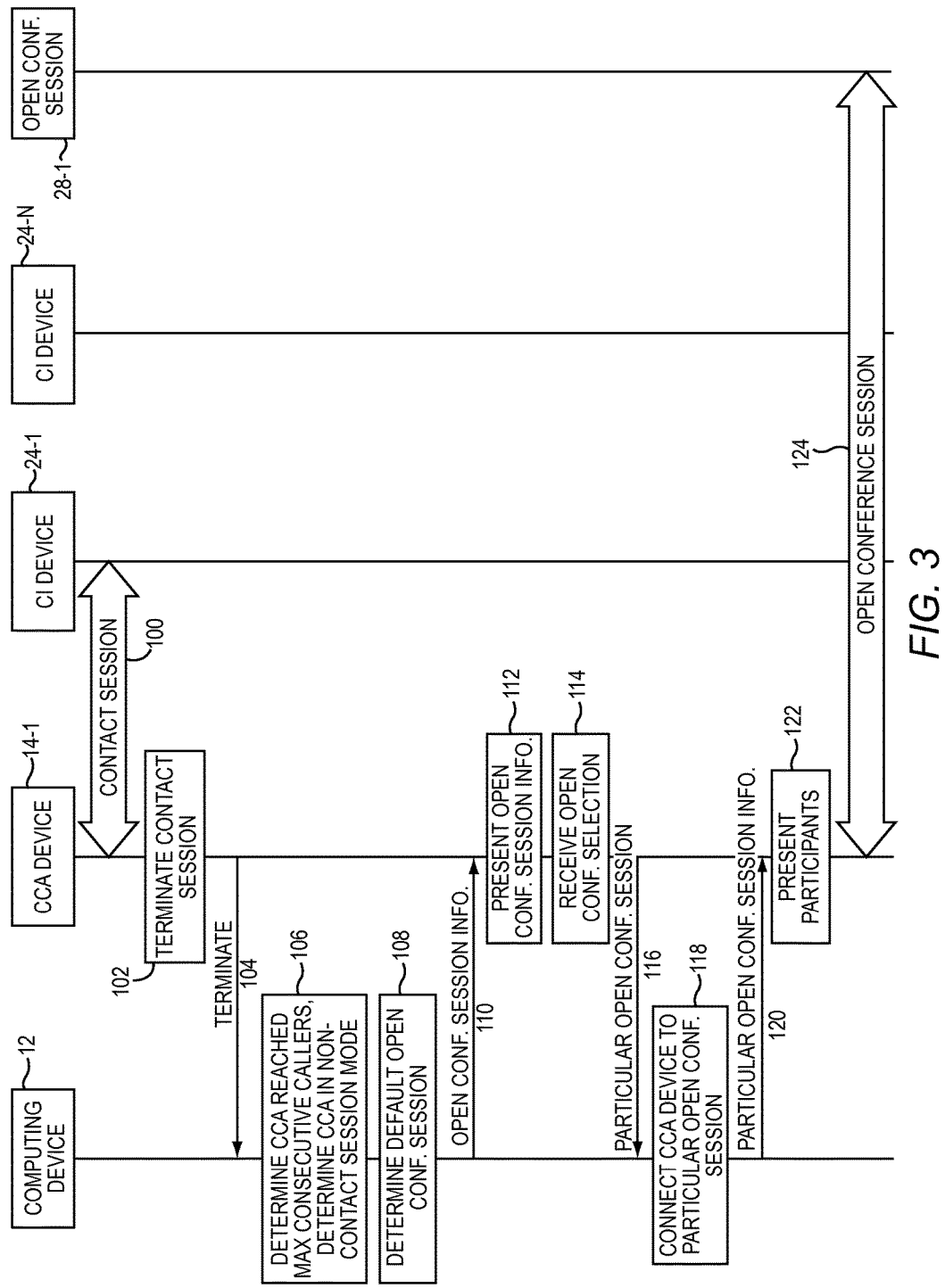
FIG. 3 is a message flow diagram illustrating an example sequence of messages between devices illustrated in FIG. 2, according to one embodiment.

FIG. 3 is a message flow diagram illustrating an example sequence of messages between devices illustrated in FIG. 2, according to one embodiment. FIG. 3 will be discussed in conjunction with FIG. 2. Assume that the CCA 18-1 and the CI 22-1 are involved in a contact session via the CCA device 14-1 and the CI device 24-1, respectively (step 100). After the CCA 18-1 terminates the call, the CCA 18-1 may record information regarding the call, and upon saving the contact session record, the CCA device 14-1 notifies the computing device 12 that the contact session has terminated (steps 102-104). The computing device 12 determines that the CCA 18-1 has reached a predetermined maximum number of consecutive callers, places the CCA 18-1 in a break mode, and thereby determines that the CCA 18-1 is in a non-contact session mode (step 106). The computing device 12 determines a default open conference session 28 for the CCA 18-1 (step 108). Mechanisms by which the computing device 12 may determine a default open conference session 28 for the CCA 18-1 are discussed in greater detail below.

It should be noted that the CCA 18-1 may be in a non-contact session mode at various times throughout a day for any number of different reasons, and may thus be available for being connected to an open conference session 28 at such various times. The computing device 12 may maintain a flag, or other indicator, indicating whether the CCA 18-1 is currently in a contact session mode or a non-contact session mode. The indicator may be set automatically, by the computing device 12, as discussed herein, or in response to other events. For example, prior to a shift starting, the CCA 18-1 may be automatically placed in the non-contact session mode. The CCA 18-1 may be able to indicate, via the CCA device 14-1, that the CCA 18-1 is taking a coffee break or permitted 15 minute break. The CCA device 14-1 may communicate this to the computing device 12, which then sets the indicator to indicate that the CCA 18-1 is in the non-contact session mode. A supervisor may be able to arbitrarily, at any time, designate that the CCA 18-1 is in the non-contact session mode.

The computing device 12 sends open conference session information to the CCA device 14-1 (step 110). The open conference session information may identify a plurality of open conference sessions 28, as well as identify the default open conference session 28 identified by the computing device 12. The plurality of open conference sessions 28 may be a subset of the available open conference sessions 28 identified by the computing device 12 based on one or more of the CCA profile 33-1, the previous call metrics 34-1, and the meta data 32. The CCA device 14-1 presents the open conference session information on the display device 26 (step 112). The CCA device 14-1 receives a selection of a particular open conference session 28 from the CCA 18-1 (step 114). The CCA device 14-1 sends information identifying the particular open conference session 28 to the computing device 12 (step 116). The computing device 12 receives the information, and based on the information, connects the CCA device 14-1 to the particular open conference session 28, which in this example for purposes of illustration, will be assumed to be the open conference session 28-1 (step 118).

The computing device 12 may also generate and communicate information regarding the particular open conference session 28-1 to the CCA device 14-1 for presentation to the CCA 18-1 (step 120). For example, the information may contain CCA identifiers of the other CCAs 18 that are currently participating in the open conference session 28-1. The CCA device 14-1 receives the information, and presents the CCA identifiers on the display device 26 (step 122). The CCA 18-1 then participates in the open conference session 28-1 (step 124).

Figure 4:
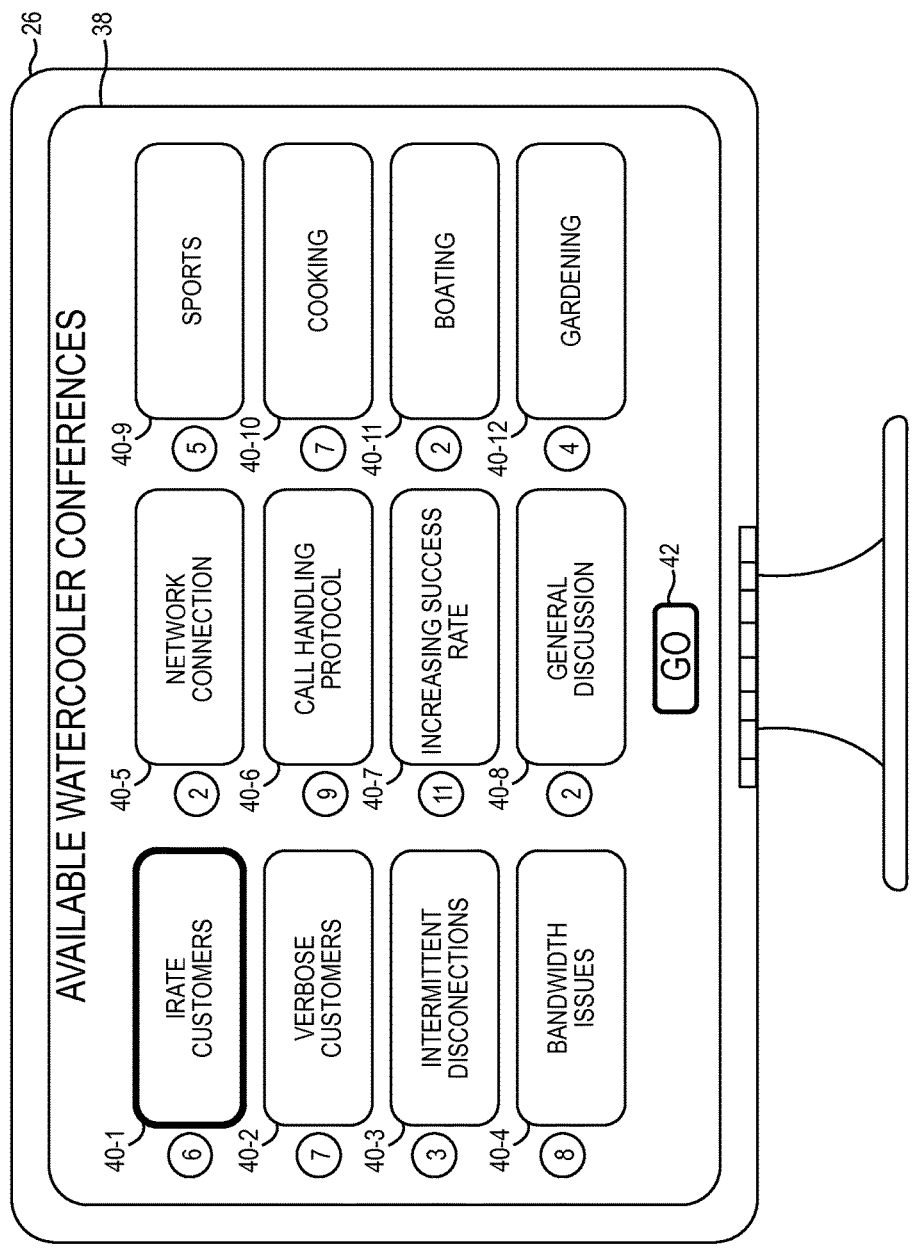
FIG. 4 illustrates an example user interface that may be presented on a display device of a contact center agent (CCA) device to present a CCA with options for selecting a particular open conference session, according to one embodiment.

FIG. 4 illustrates an example user interface 38 that may be presented on the display device 26 of the CCA device 14-1 to present the CCA 18 with options for selecting a particular open conference session 28, according to one embodiment. The user interface 38 illustrates example information that the CCA device 14-1 may have received from the computing device 12 at step 110 of FIG. 3. The information includes a plurality of open conference session identifiers 40-1-40-12 that identify corresponding open conference sessions 28 that are available for selection by the CCA 18. The open conference session identifier 40-1 is emphasized, in this example, by a thickened border, to identify a default open conference session 28 that was determined by the computing device 12.

The information received from the computing device 12 may have also included, for each open conference session 28, the number of current participants in the respective open conference session 28, which is identified in the user interface 38 by a number located inside a circle adjacent to each open conference session identifier 40-1-40-12. The CCA 18 may accept the default open conference session 28, in this example an "Irate Customers" open conference session 28, by selecting a GO user control 42. Alternatively, the CCA 18 may select another open conference session identifier 40, such as via a mouse, and thereby choose a different open conference session 28 than the default open conference session 28. For purposes of illustration, assume that the CCA 18-1 accepted the default open conference session 28-1 identified by the open conference session identifier 40-1.

Figure 5:
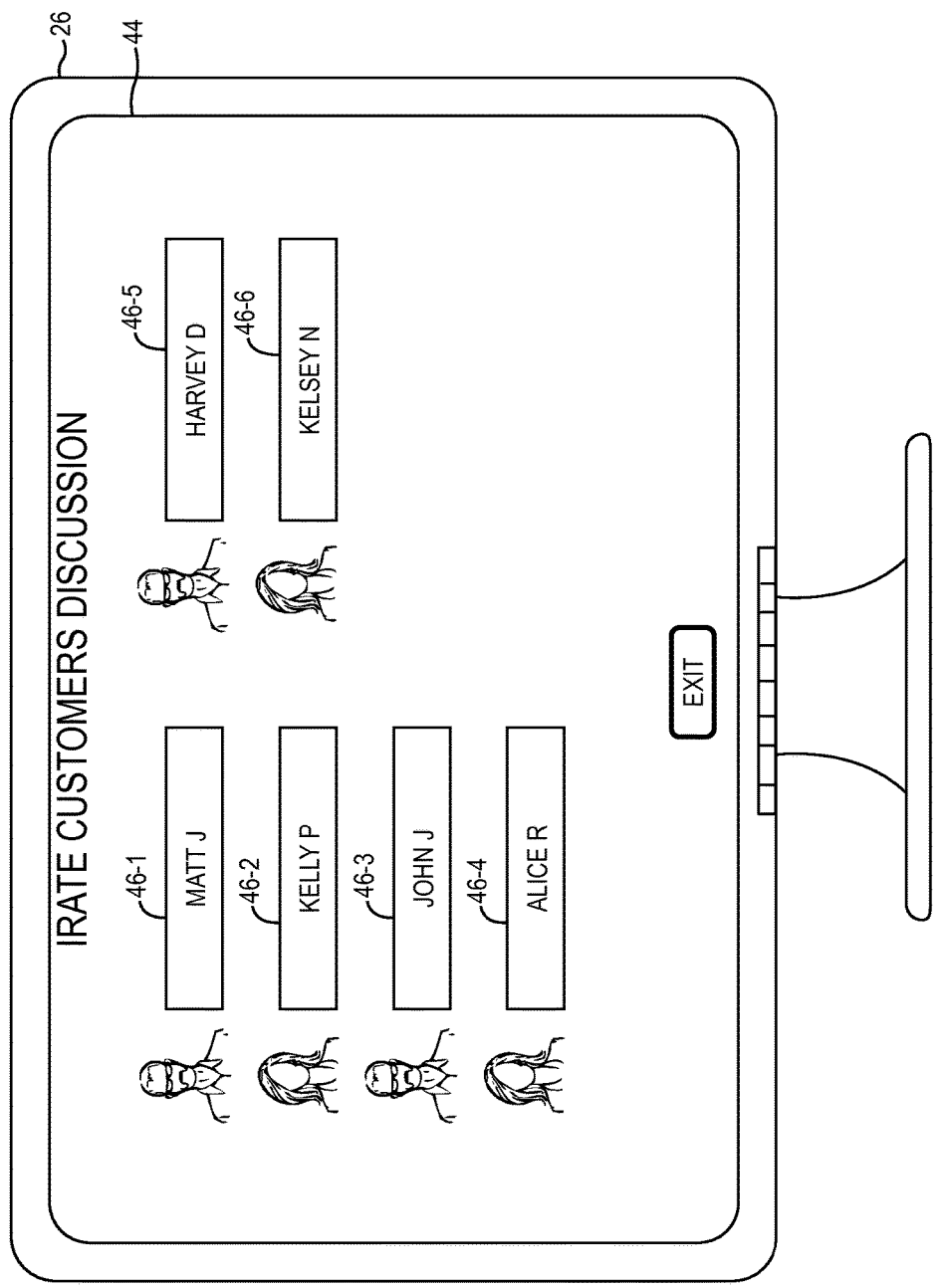
FIG. 5 illustrates an example user interface that may be presented on a display device of the CCA device to present the CCA with information regarding the current participants of an open conference session, according to one embodiment.

FIG. 5 illustrates an example user interface 44 that may be presented on the display device 26 of the CCA device 14-1 to present the CCA 18-1 with information regarding the current participants of the open conference session 28-1, according to one embodiment. The user interface 44 illustrates example information that the CCA device 14-1 may have received from the computing device 12 at step 120 of FIG. 3. The information includes a plurality of CCA identifiers 46-1-46-6 that identify the CCAs 18 that are currently participating in the open conference session 28-1. This feature allows the CCA 18-1 to immediately know which of his colleagues are currently connected to the open conference session 28-1.

Figure 6:
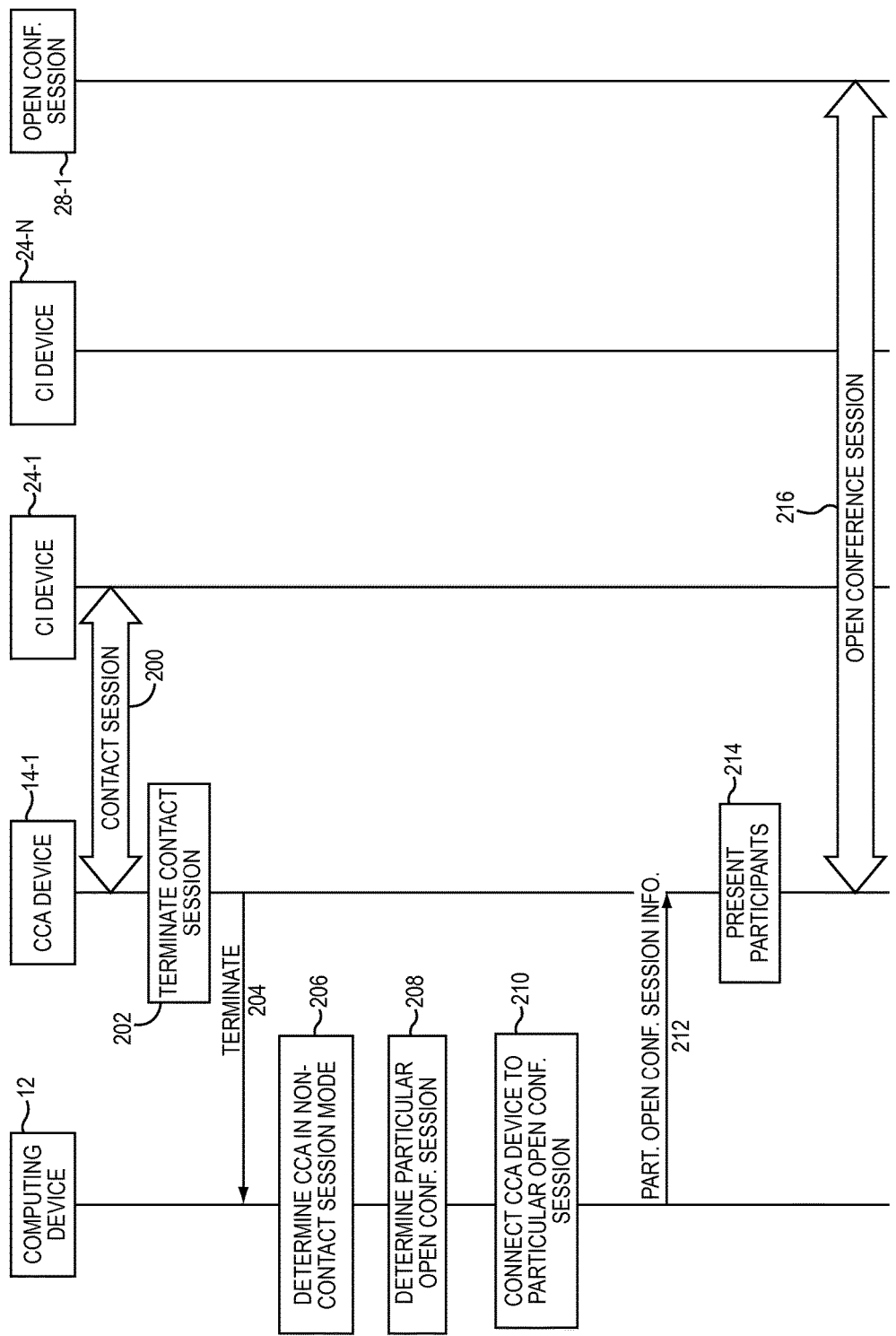
FIG. 6 is a message flow diagram illustrating an example sequence of messages between devices illustrated in FIG. 2, according to another embodiment.

FIG. 6 is a message flow diagram illustrating an example sequence of messages between devices illustrated in FIG. 2, according to another embodiment. In this embodiment, steps 200-204 are substantially similar to steps 100-104 discussed above with regard to FIG. 3. The computing device 12 determines that no additional callers are queued for the CCA 18-1, and thus determines that the CCA 18-1 is in a non-contact session mode (step 206). The computing device 12 determines a particular open conference session 28 of the plurality of open conference sessions 28 (step 208). The computing device 12 may make such determination based on, for example, the CCA profile 33-1, the previous call metrics 34-1, and/or the meta data 32. Again, for purposes of illustration, assume that the computing device 12 determines the open conference session 28-1 as the particular open conference session 28. In this embodiment, however, instead of providing the CCA 18-1 with a choice of open conference sessions 28, the computing device 12 automatically connects the CCA device 14-1 to the open conference session 28-1, without input from the CCA 18-1 (step 210). The computing device 12 also generates and communicates information regarding the particular open conference session 28-1 to the CCA device 14-1 for presentation to the CCA 18-1 (step 212). Again, the information may contain CCA identifiers of the other CCAs 18 that are currently participating in the open conference session 28-1. The CCA device 14-1 receives the information, and presents the CCA identifiers on the display device 26 (step 214). The CCA 18 then participates in the open conference session 28-1 (step 216).

Figure 7:
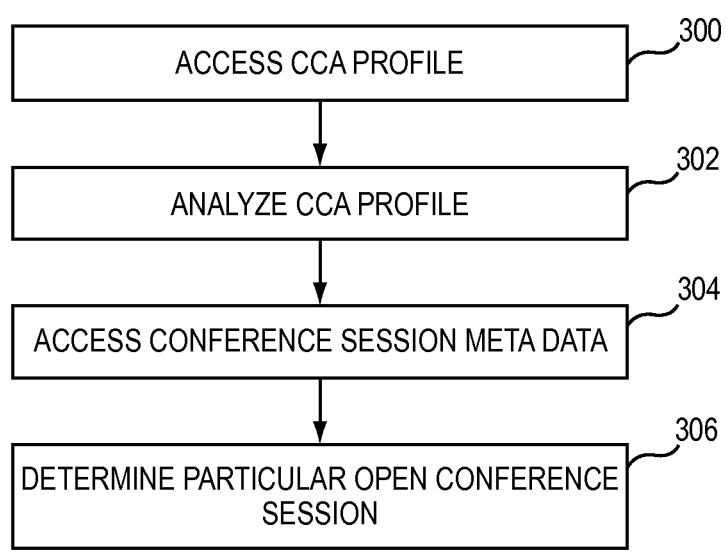
FIG. 7 is a flowchart of a method for determining a particular open conference session of a plurality of open conference sessions, according to one embodiment.

FIG. 7 is a flowchart of a method for determining a particular open conference session 28 of the plurality of open conference sessions 28, according to one embodiment. In this embodiment, when the computing device 12 determines that the CCA 18-1 is in the non-contact session mode, the computing device 12 determines a criterion for identification of a default open conference session 28. The criterion may be identified in the CCA profile 33-1, or may be a system wide criterion. In this example, assume that the criterion is based on preferences identified by the CCA 18-1. The computing device 12 accesses the CCA profile 33-1 associated with the CCA 18-1 (block 300). The computing device 12 analyzes the CCA profile 33-1 and determines that the CCA 18-1 has interests in football, boating, and movies (block 302). The computing device 12 also accesses the meta data 32 and determines that the meta data 32-N identifies the open conference session 28-N as having a discussion topic of boating (block 304). The computing device 12 then determines the open conference session 28-N as the particular open conference session 28 to provide as a default open conference session 28 for the CCA 18-1, or as the open conference session 28 to which the computing device 12 will automatically connect the CCA 18-1 (block 306).

Figure 8:
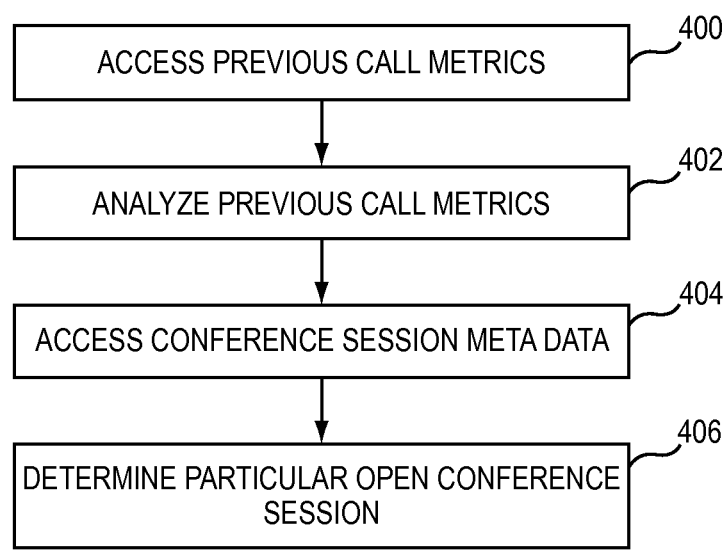
FIG. 8 is a flowchart of a method for determining a particular open conference session of the plurality of open conference sessions, according to another embodiment.

FIG. 8 is a flowchart of a method for determining a particular open conference session 28 of the plurality of open conference sessions 28, according to another embodiment. In this embodiment, when the computing device 12 determines that the CCA 18-1 is in the non-contact session mode, the computing device 12 determines that the criterion for identification of a default open conference session 28 is based on the emotional state of the CCA 18-1 in previous contact sessions. The computing device 12 accesses the previous call metrics 34-1 associated with the CCA 18-1 (block 400). The computing device 12 analyzes the previous call metrics 34-1 and determines, based on the emotional state data 36-3, that the CCA 18-1 has been agitated during recent previous contact sessions (block 402). The computing device 12 also accesses the meta data 32 associated with the open conference sessions 28 and determines that the meta data 32-1 identifies the open conference session 28-1 as having a discussion topic of irate customers (block 404). The computing device 12 then determines the open conference session 28-1 as the particular open conference session 28 to provide as a default open conference session 28 for the CCA 18-1, or as the open conference session 28 to which the computing device 12 will automatically connect the CCA 18-1 (block 406).

In another embodiment, the computing device 12 determines that the criterion for identifying a default open conference session 28 is based on the topic of a previous contact session. The computing device 12 accesses the previous call metrics 34-1, and, based on the topic data 36-1, determines a topic of a previous contact session handled by the CCA 18-1. For example, the previous topic may be intermittent disconnections. The computing device 12 accesses the meta data 32 associated with the open conference sessions 28 and determines that the meta data 32-3 identifies the open conference session 28-3 as having a discussion topic of intermittent disconnections. The computing device 12 then determines the open conference session 28-3 as the particular open conference session 28 to provide as a default open conference session 28 for the CCA 18-1, or as the open conference session 28 to which the computing device 12 will automatically connect the CCA 18-1.

Figure 9:
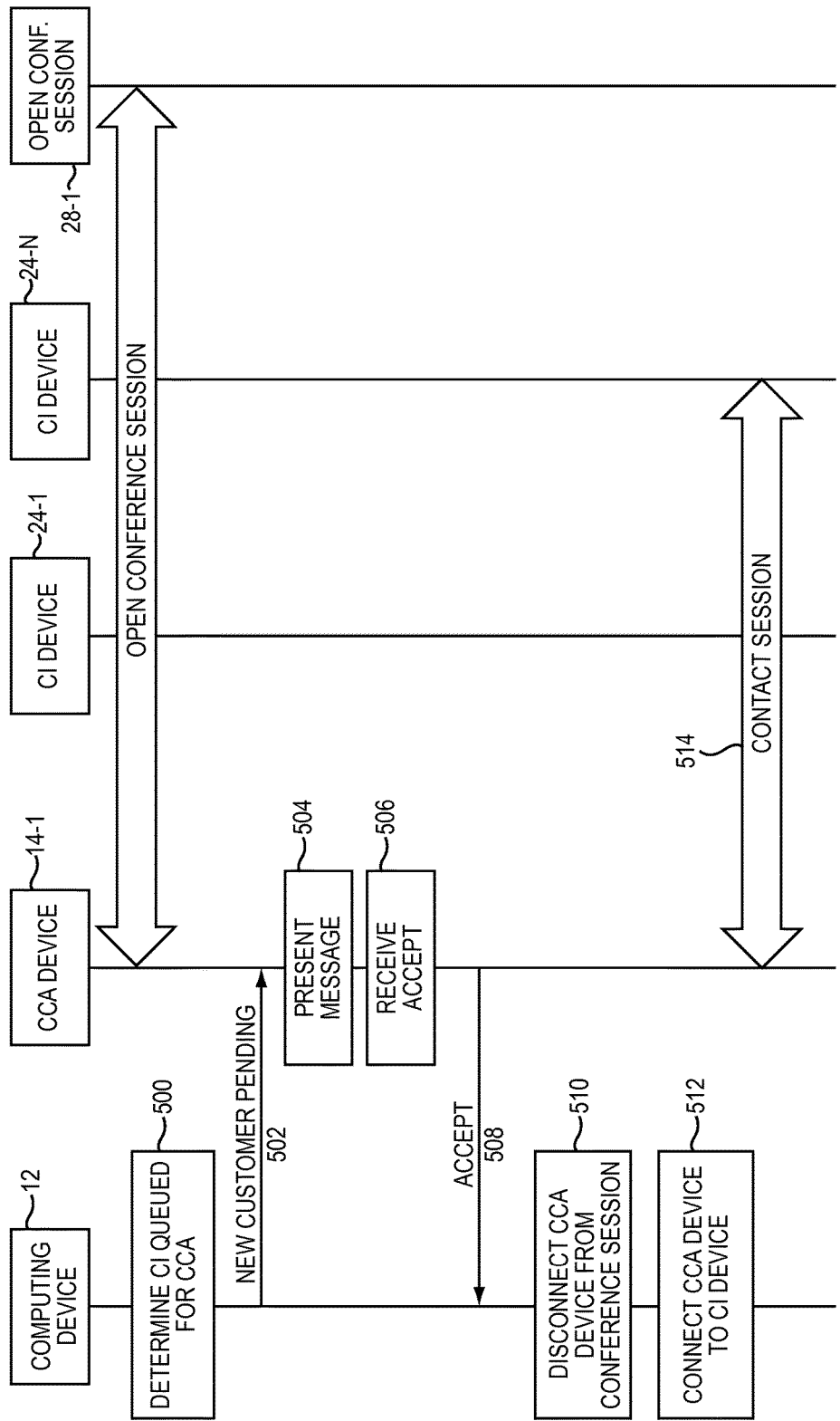
FIG. 9 is a message flow diagram illustrating an example sequence of messages between devices illustrated in FIG. 2 when a CCA is in an open conference session and a computing device determines that a new contact session is to be processed by the CCA, according to one embodiment.

FIG. 9 is a message flow diagram illustrating an example sequence of messages between devices illustrated in FIG. 2 when the CCA 18-1 is in an open conference session 28 and the computing device 12 determines that a new contact session is to be processed by the CCA 18-1, according to one embodiment. The computing device 12 determines that a CI 22-N is queued for the CCA 18-1 (step 500). The computing device 12 generates a message that indicates that a transfer to a new customer is pending and communicates the message to the CCA device 14-1 (step 502). The CCA device 14-1 receives the message and presents the message to the CCA 18-1 via the display device 26 (step 504). In one embodiment, the message may allow the CCA 18-1 to accept the transfer or reject the transfer. If the CCA 18-1 rejects the transfer, the computing device 12 queues the CI 22-N to another CCA 18. In other embodiments, the message may simply inform the CCA 18-1 that a transfer is about to occur. Assume in this example that the message allows the CCA 18-1 to accept or reject the transfer, and the CCA 18-1 indicates acceptance of the transfer. The CCA device 14-1 receives the acceptance and communicates the acceptance to the computing device 12 (steps 506-508). The computing device 12 disconnects the CCA device 14-1 from the open conference session 28-1, and connects the CCA device 14-1 to the CI device 24-N (steps 510-512). The CCA 18-1 and the CI 22-N then engage in a contact session (step 514).

Figure 10:
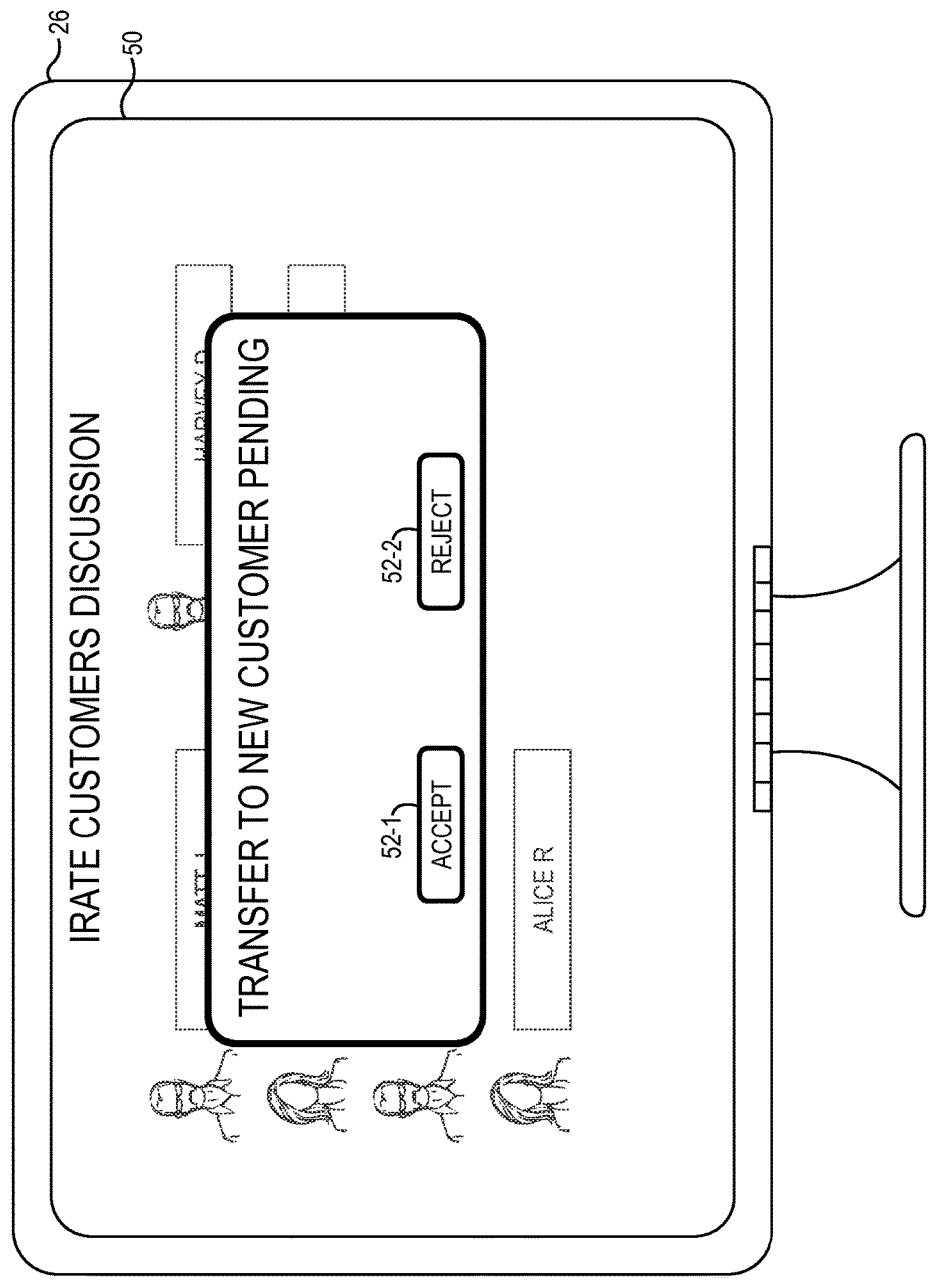
FIG. 10 illustrates an example user interface that may be presented on a display device of a CCA device to indicate to a CCA that a transfer is imminent, according to one embodiment.

FIG. 10 illustrates an example user interface 50 that may be presented on the display device 26 of the CCA device 14-1 to indicate to the CCA 18-1 that a transfer is imminent, according to one embodiment. In this embodiment, while participating in the open conference session 28-1, the CCA device 14-1 presents the user interface 50 on the display device 26. The user interface 50 includes an accept user control 52-1 and a reject user control 52-2. The CCA 18-1 may select the accept user control 52-1 to accept the pending transfer, or the reject user control 52-2 to reject the pending transfer.

Figure 11:
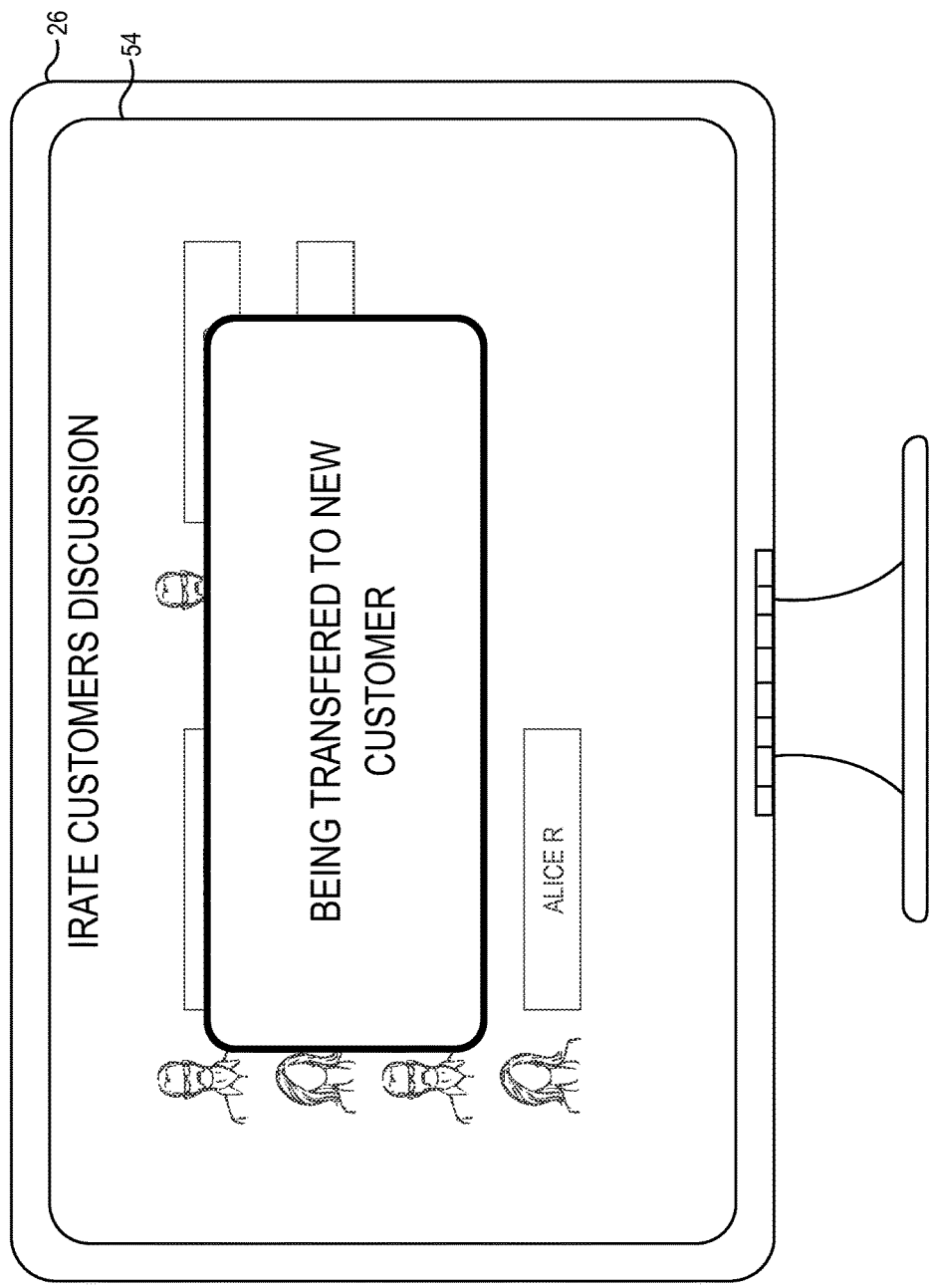
FIG. 11 illustrates an example user interface that may be presented on a display device of a CCA device to indicate to a CCA that a transfer is imminent, according to another embodiment.

FIG. 11 illustrates an example user interface 54 that may be presented on the display device 26 of the CCA device 14-1 to indicate to the CCA 18-1 that a transfer is imminent, according to another embodiment. In this embodiment, while participating in the open conference session 28-1, the CCA device 14-1 presents the user interface 54 on the display device 26. The user interface 54 informs the CCA 18-1 that the CCA 18-1 is being transferred to a new contact session. The CCA 18-1 is then, automatically, without any user input, transferred to the new contact session.

Figure 12:
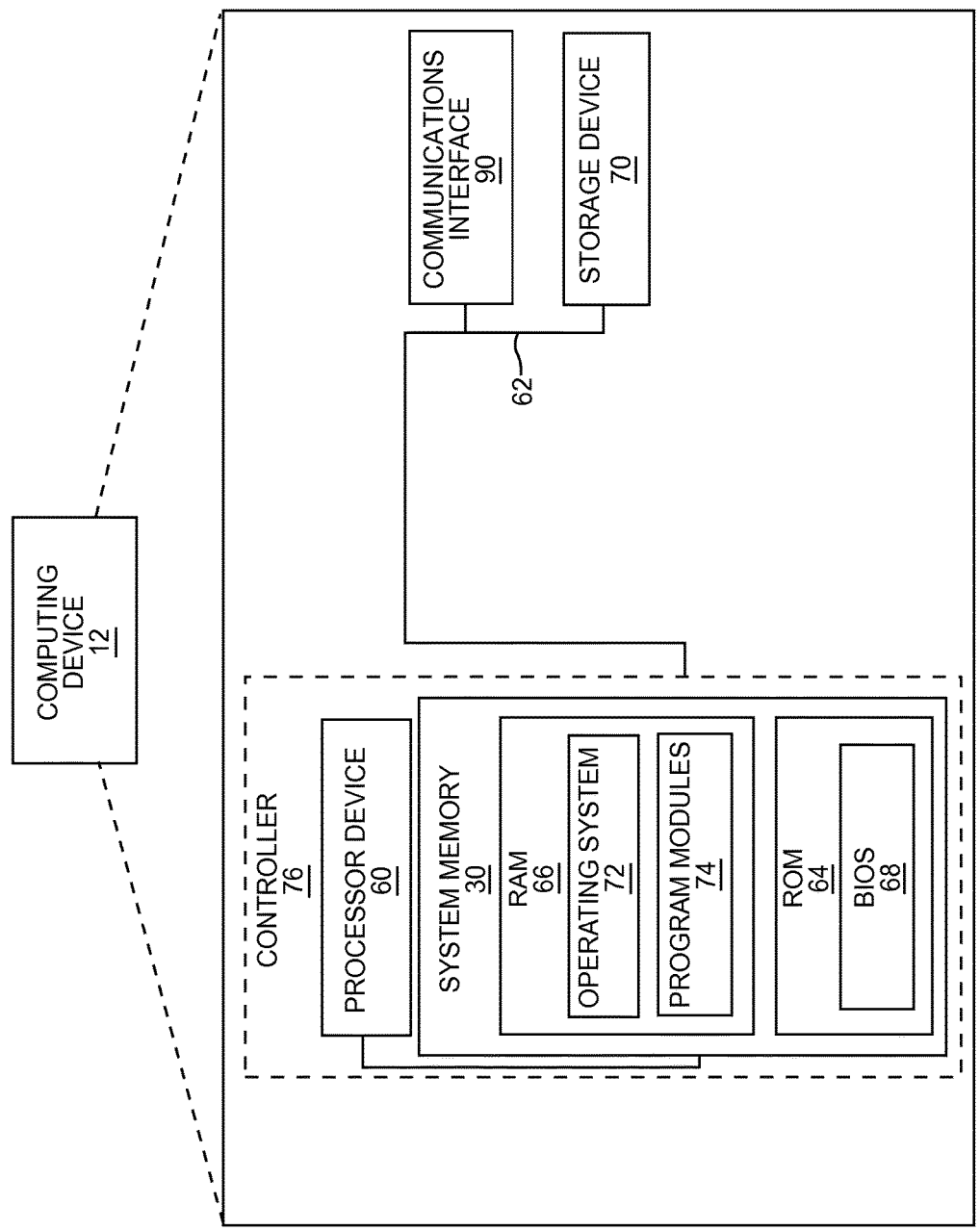
FIG. 12 is a block diagram of the computing device, according to one embodiment.

FIG. 12 is a block diagram of the computing device 12, according to one embodiment. The computing device 12 may comprise any computing or processing device capable of including firmware, hardware, and/or executing software instructions to implement the functionality described herein, including a desktop computer, laptop computer, telecommunications switch, or special purpose computing device. The computing device 12 includes a processor device 60, the system memory 30, and a system bus 62. The system bus 62 provides an interface for system components including, but not limited to, the system memory 30 and the processor device 60. The processor device 60 can be any commercially available or proprietary processor.

The system bus 62 may be any of several types of bus structures that may further interconnect to a memory bus (with or without a memory controller), a peripheral bus, and/or a local bus using any of a variety of commercially available bus architectures. The system memory 30 may include non-volatile memory 64 (e.g., read only memory (ROM), erasable programmable read only memory (EPROM), electrically erasable programmable read only memory (EEPROM), etc.) and/or volatile memory 66 (e.g., random access memory (RAM)). A basic input/output system (BIOS) 68 may be stored in the non-volatile memory 64, and can include the basic routines that help to transfer information between elements within the computing device 12. The volatile memory 66 may also include a high-speed RAM, such as static RAM for caching data.

The computing device 12 may further include or be coupled to a computer-readable storage device 70, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage device 70 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media that are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage device 70 and in the volatile memory 66, including an operating system 72 and one or more program modules 74, which may implement the functionality described herein in whole or in part.

All or a portion of the embodiments may be implemented as a computer program product stored on a transitory or non-transitory computer-usable or computer-readable storage medium, such as the computer-readable storage device 70, which includes complex programming instructions, such as complex computer-readable program code, configured to cause the processor device 60 to carry out the steps described herein. Thus, the computer-readable program code can comprise software instructions for implementing the functionality of the embodiments described herein when executed on the processor device 60. The processor device 60, in conjunction with the program modules 74 in the volatile memory 66, may serve as a controller 76 for the computing device 12 that is configured to, or adapted to, implement the functionality described herein.

The computing device 12 may also include a communications interface 78, suitable for communicating with the network 16 and other networks as appropriate or desired, as well as the CI devices 24 and the CCA devices 14.

Figure 13:
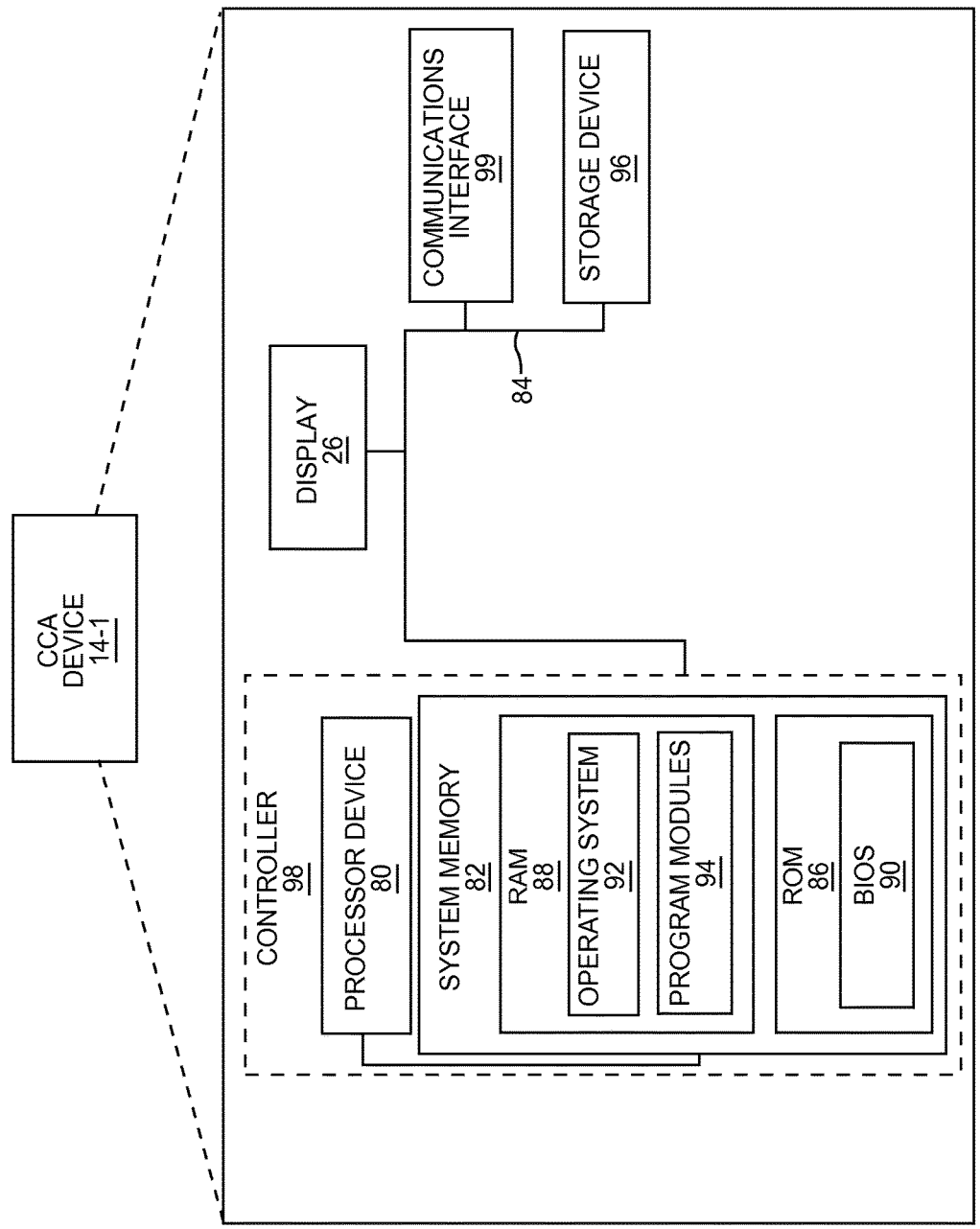
FIG. 13 is a block diagram of a CCA device, according to one embodiment.

FIG. 13 is a block diagram of the CCA device 14-1, according to one embodiment. The CCA device 14-1 may comprise any computing or processing device capable of including firmware, hardware, and/or executing software instructions to implement the functionality described herein, including a desktop computer, laptop computer, telecommunications switch, or special purpose computing device. The CCA device 14-1 includes a processor device 80, a system memory 82, and a system bus 84. The system bus 84 provides an interface for system components including, but not limited to, the system memory 82 and the processor device 80. The processor device 80 can be any commercially available or proprietary processor.

The system bus 84 may be any of several types of bus structures that may further interconnect to a memory bus (with or without a memory controller), a peripheral bus, and/or a local bus using any of a variety of commercially available bus architectures. The system memory 82 may include non-volatile memory 86 (e.g., read only memory (ROM), erasable programmable read only memory (EPROM), electrically erasable programmable read only memory (EEPROM), etc.) and/or volatile memory 88 (e.g., random access memory (RAM)). A basic input/output system (BIOS) 90 may be stored in the non-volatile memory 86, and can include the basic routines that help to transfer information between elements within the CCA device 14-1. The volatile memory 88 may also include a high-speed RAM, such as static RAM for caching data.

The CCA device 14-1 may further include or be coupled to a computer-readable storage device 96, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage device 96 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage device 96 and in the volatile memory 88, including an operating system 92 and one or more program modules 94, which may implement the functionality described herein in whole or in part.

All or a portion of the embodiments may be implemented as a computer program product stored on a transitory or non-transitory computer-usable or computer-readable storage medium, such as a computer-readable storage device 96, which includes complex programming instructions, such as complex computer-readable program code, configured to cause the processor device 80 to carry out the steps described herein. Thus, the computer-readable program code can comprise software instructions for implementing the functionality of the embodiments described herein when executed on the processor device 80. The processor device 80, in conjunction with the program modules 94 in the volatile memory 88, may serve as a controller 98 for the CCA device 14-1 that is configured to, or adapted to, implement the functionality described herein.

The CCA device 14-1 may also include a communications interface 99, suitable for communicating with the network 16 and other networks as appropriate or desired, as well as the CI devices 24 and the computing device 12.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    maintaining, by a computing device comprising a processor, a set of previous call metrics corresponding to each contact center agent (CCA) of a plurality of CCAs in a contact center, the set of previous call metrics related to one or more completed contact sessions between the corresponding CCA and a contacting individual (CI) of the contact center;
    conducting, by the computing device, a plurality of open conference sessions, each open conference session comprising a session with one or more CCAs or CCA supervisors and without a CI, wherein each of the one or more CCAs or CCA supervisors are in a non-contact session mode;
    maintaining, by the computing device, a set of metadata corresponding to each of the plurality of open conference sessions, the set of metadata identifying CCA or CCA supervisors in the corresponding session or content of the corresponding session;
    determining, by a computing device comprising a processor device, that a CCA is in a non-contact session mode, wherein determining that the CCA is in a non-contact session mode comprises determining that the CCA has reached a predetermined maximum number of callers and is placed in a break mode and wherein the non-contact session mode comprises a mode in which the CCA is not in a session with a CI of the contact center;
    identifying, by the computing device, a particular open conference session of the plurality of open conference sessions based at least in part on the set of previous call metrics corresponding to the CCA and the metadata corresponding to each of the plurality of open conference sessions; and
    connecting, by the computing device, a CCA device associated with the CCA to the particular open conference session while the CCA remains in the non-contact session mode.

2. The method of claim 1, wherein determining that the CCA is in a non-contact session mode comprises determining a termination of a contact session between the CCA device and a contacting individual (CI) device associated with a CI.

3. The method of claim 1, wherein determining that the CCA is in a non-contact session mode comprises determining that the CCA is in a break mode.

4. The method of claim 1, wherein identifying the particular open conference session of the plurality of open conference sessions comprises identifying the particular open conference session based on a criterion related to one or more of the previous call metrics without input from the CCA.

5. The method of claim 4, wherein connecting the CCA device associated with the CCA to the particular open conference session comprises automatically, without CCA interaction, connecting the CCA device to the particular open conference session.

6. The method of claim 4, wherein the previous call metrics comprise a plurality of a topic of a previous contact session handled by the CCA, a duration of a previous contact session handled by the CCA, an identified emotional state of the CCA during a previous contact session handled by the CCA, compliance data quantifying an extent to which the CCA followed established protocols in a previous contact session handed by the CCA, or a call success rate quantifying an extent to which a plurality of previous contact sessions handled by the CCA resulted in successful resolution.

7. The method of claim 1, wherein identifying the particular open conference session of the plurality of open conference sessions comprises:
    selecting a subset of open conference sessions of the plurality of open conference sessions based on a criterion;
    communicating, to the CCA device, a list identifying the subset of open conference sessions; and
    receiving, from the CCA device, a user selection of the particular open conference session from the list identifying the subset of open conference sessions.

8. The method of claim 7, wherein the criterion is based on a preference identified by the CCA, and further comprising:
    accessing an agent profile associated with the CCA; and
    based on the agent profile, determining the preference identified by the CCA.

9. The method of claim 1, further comprising:
    determining that a new contact session is to be processed by the CCA;
    automatically, without CCA input, disconnecting the CCA device from the particular open conference session; and
    connecting the CCA device to the new contact session.

10. The method of claim 9, further comprising alerting the CCA that the CCA device is being disconnected from the particular open conference session.

11. The method of claim 1, further comprising:
    determining an identity of each other CCA of a plurality of CCAs in the particular open conference session; and
    sending the identity of each other CCA to the CCA device for presentation to the CCA.

12. A computing device comprising:
    a communications interface configured to communicate with a network; and
    a controller comprising a processor device coupled to the communications interface, the controller configured to:
    maintain a set of previous call metrics corresponding to each contact center agent (CCA) of a plurality of CCAs in a contact center, the set of previous call metrics related to one or more completed contact sessions between the corresponding CCA and a contacting individual (CI) of the contact center;
    conduct a plurality of open conference sessions, each open conference session comprising a session with one or more CCAs or CCA supervisors and without a CI, wherein each of the one or more CCAs or CCA supervisors are in a non-contact session mode;
    maintain a set of metadata corresponding to each of the plurality of open conference sessions, the set of metadata identifying CCA or CCA supervisors in the corresponding session or content of the corresponding session;
    determine that a CCA is in a non-contact session mode, wherein determining that the CCA is in a non-contact session mode comprises determining that the CCA has reached a predetermined maximum number of callers and is placed in a break mode and wherein the non-contact session mode comprises a mode in which the CCA is not in a session with a CI of the contact center;
    identify a particular open conference session of the plurality of open conference sessions based at least in part on the set of previous call metrics corresponding to the CCA and the metadata corresponding to each of the plurality of open conference sessions; and
    connect a CCA device associated with the CCA to the particular open conference session while the CCA remains in the non-contact session mode.

13. The computing device of claim 12, wherein to determine that the CCA is in a non-contact session mode, the controller is further configured to determine a termination of a contact session between the CCA device and a contacting individual (CI) device associated with a CI.

14. The computing device of claim 12, wherein to determine that the CCA is in a non-contact session mode, the controller is further configured to determine that the CCA is in a break mode.

15. The computing device of claim 12, wherein to identify the particular open conference session of the plurality of open conference sessions, the controller is further configured to identify the particular open conference session based on a criterion related to one or more of the previous call metrics without input from the CCA.

16. The computing device of claim 15, wherein to connect the CCA device associated with the CCA to the particular open conference session, the controller is further configured to automatically, without CCA interaction, connect the CCA device to the particular open conference session.

17. The computing device of claim 15, wherein the previous call metrics comprise a plurality of a topic of a previous contact session handled by the CCA, a duration of a previous contact session handled by the CCA, an identified emotional state of the CCA during a previous contact session handled by the CCA, compliance data quantifying an extent to which the CCA followed established protocols in a previous contact session handed by the CCA, or a call success rate quantifying an extent to which a plurality of previous contact sessions handled by the CCA resulted in successful resolution.

18. The computing device of claim 12, wherein to identify the particular open conference session of the plurality of open conference sessions, the controller is further configured to:
    select a subset of open conference sessions of the plurality of open conference sessions based on a criterion;

communicate, to the CCA device, a list identifying the subset of open conference sessions; and receive, from the CCA device, a user selection of the particular open conference session from the list identifying the subset of open conference sessions.

19. The computing device of claim 18, wherein the criterion is based on a preference identified by the CCA, and wherein the controller is further configured to:

access an agent profile associated with the CCA; and based on the agent profile, determine the preference identified by the CCA.

20. The computing device of claim 12, wherein the controller is further configured to:

determine that a new contact session is to be processed by the CCA;

automatically, without CCA input, disconnect the CCA device from the particular open conference session; and connect the CCA device to the new contact session.

* * * * *